Nov. 25, 1947.   C. W. KRAUS   2,431,615
METHOD OF MANUFACTURING BUILDING ELEMENTS
Original Filed Oct. 10, 1942   5 Sheets-Sheet 5

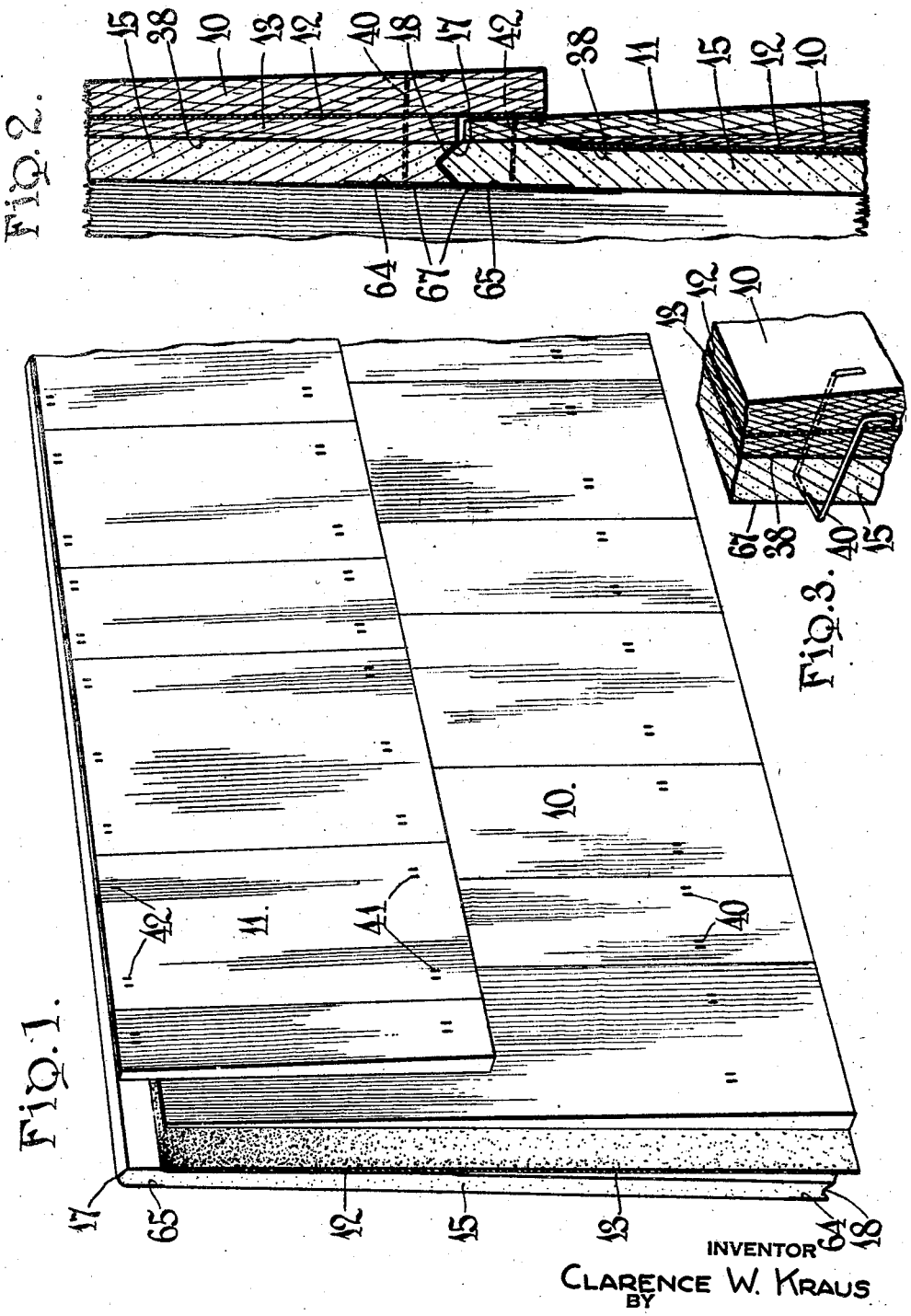
Nov. 25, 1947. C. W. KRAUS 2,431,615
METHOD OF MANUFACTURING BUILDING ELEMENTS
Original Filed Oct. 10, 1942 5 Sheets-Sheet 1
INVENTOR
CLARENCE W. KRAUS
BY
Beau, Brooks, Buckley & Beau, ATTORNEYS Nov. 25, 1947.  C. W. KRAUS  2,431,615
METHOD OF MANUFACTURING BUILDING ELEMENTS
Original Filed Oct. 10, 1942  5 Sheets-Sheet 2
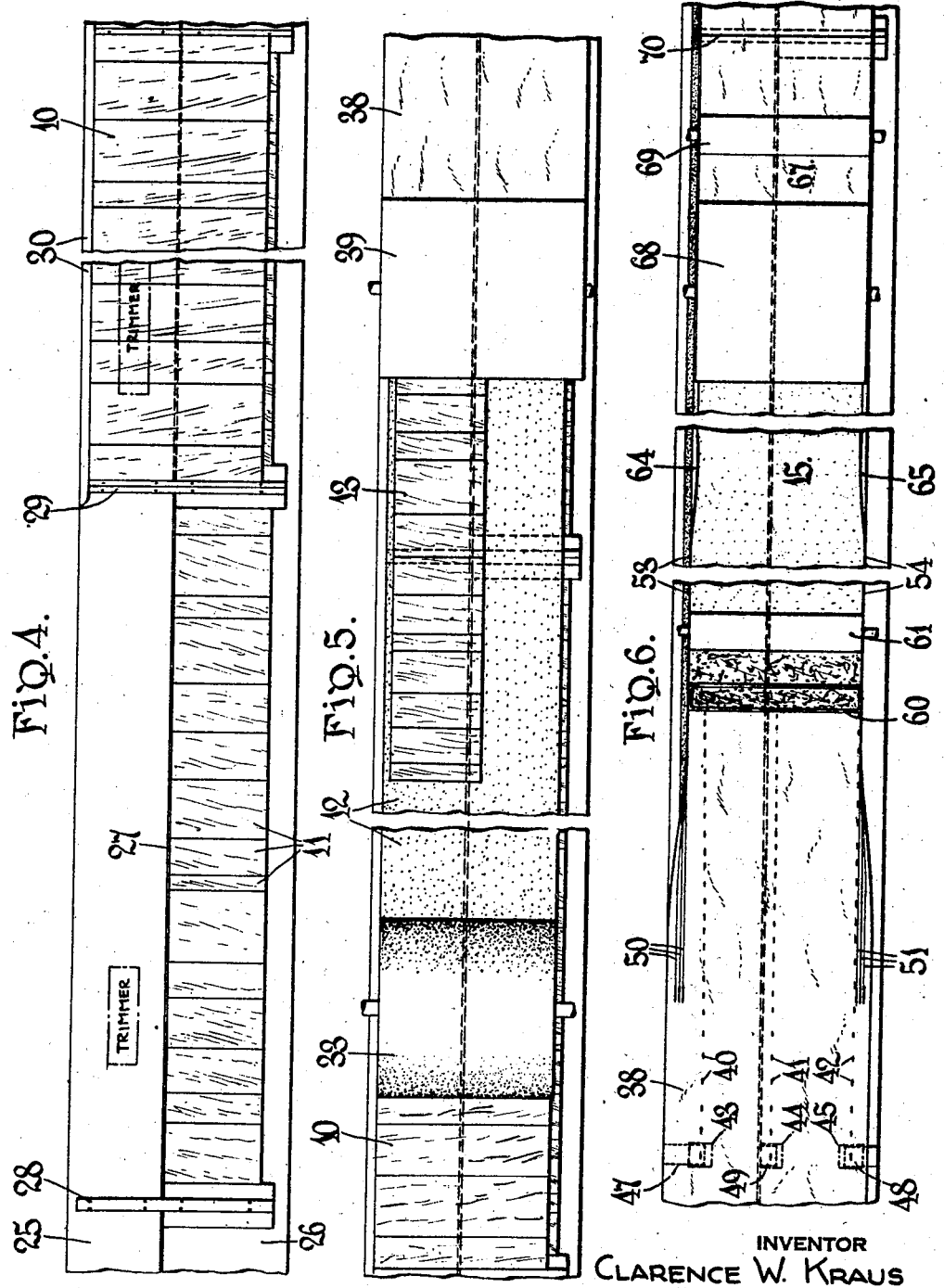
INVENTOR
CLARENCE W. KRAUS
BY
Beau, Brooks, Buckley & Beau ATTORNEYS Nov. 25, 1947.  C. W. KRAUS  2,431,615
METHOD OF MANUFACTURING BUILDING ELEMENTS
Original Filed Oct. 10, 1942   5 Sheets-Sheet 3
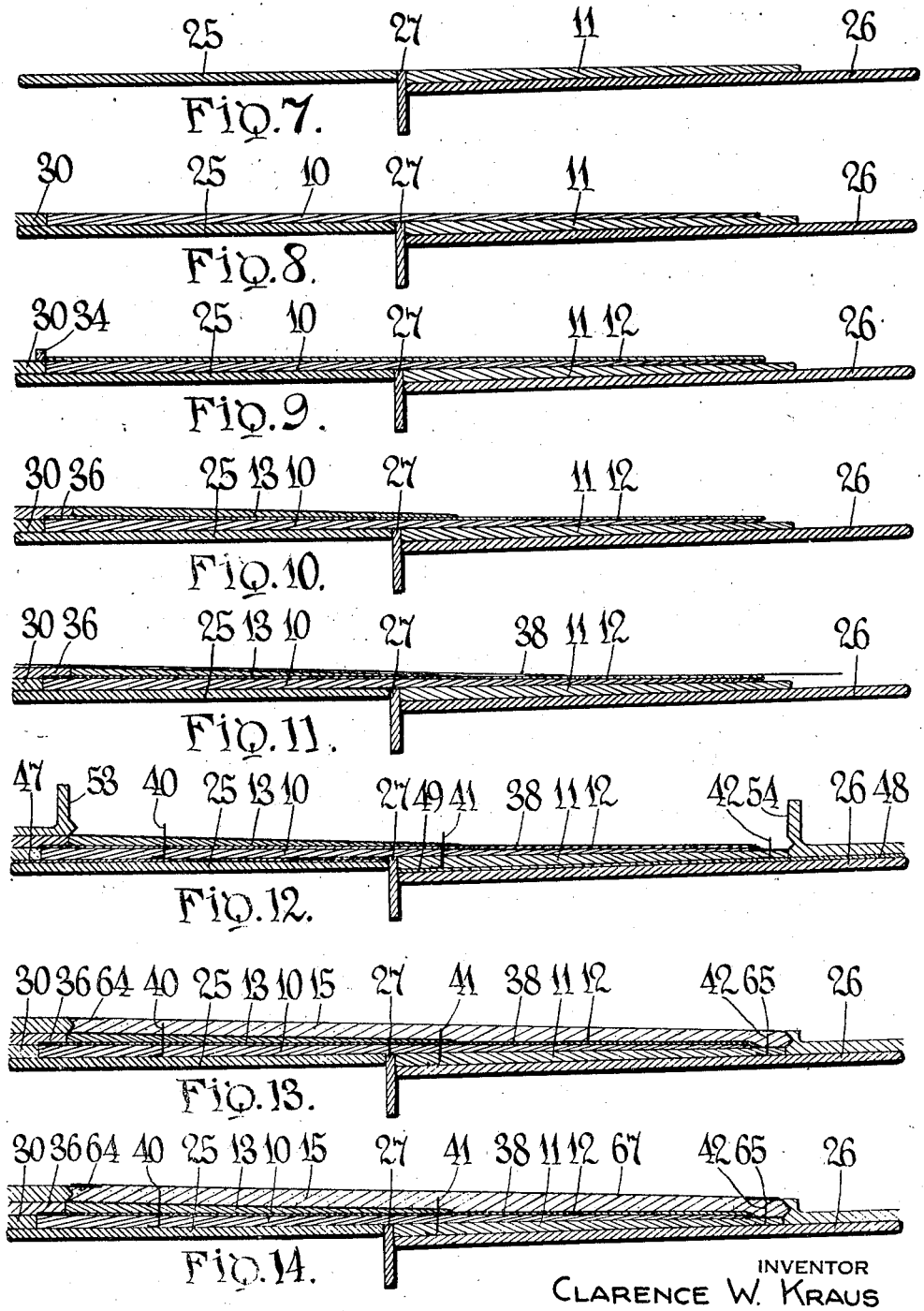
INVENTOR
CLARENCE W. KRAUS
BY
Beau, Brooks, Buckley & Beau, ATTORNEYS

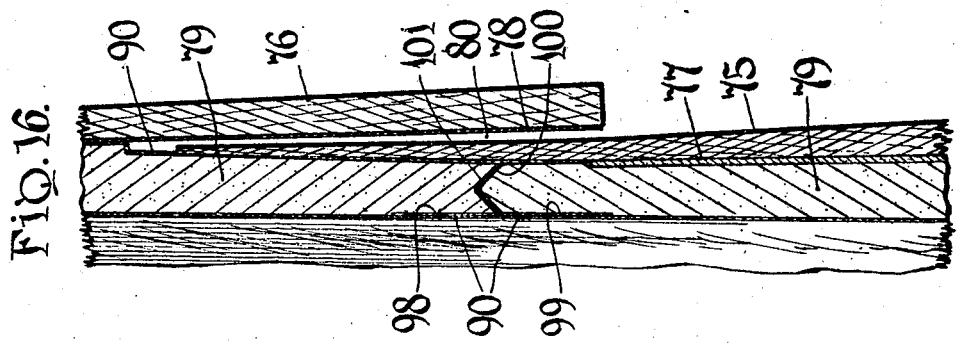
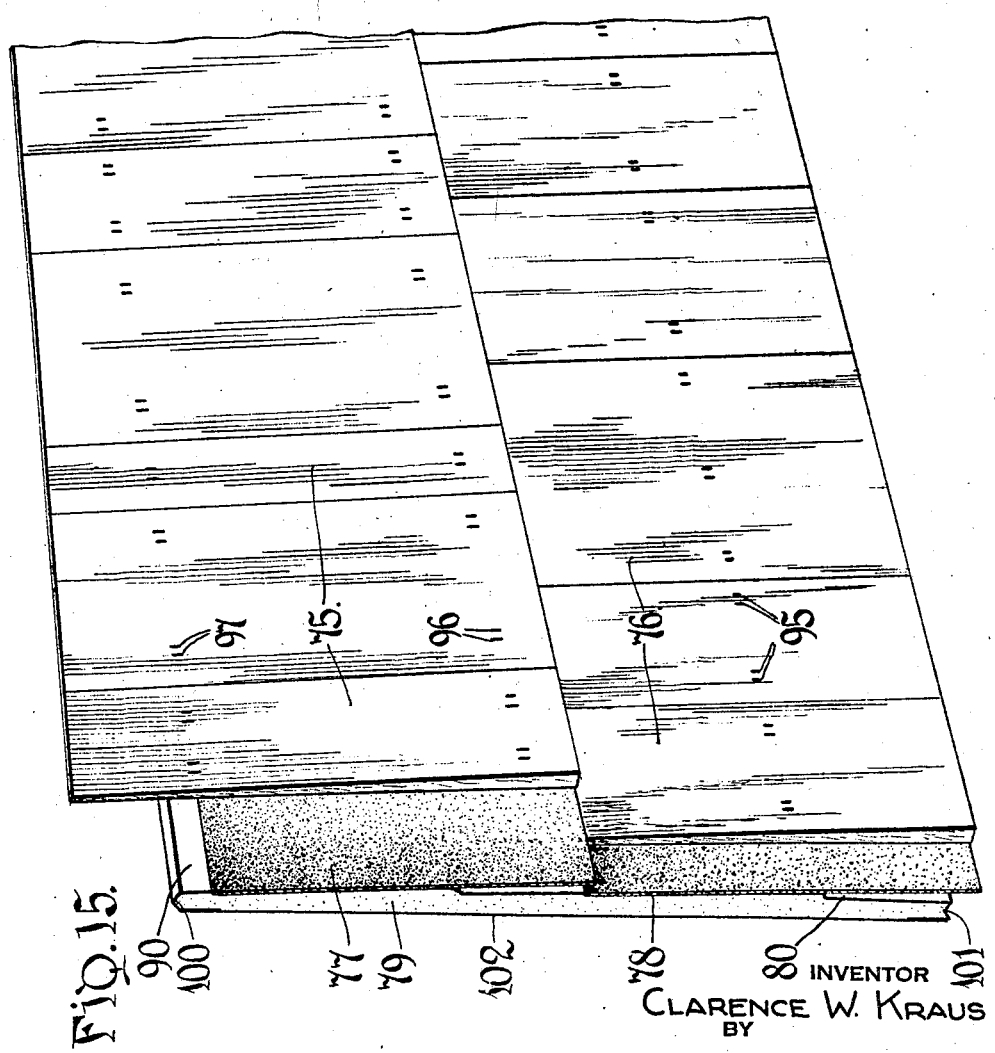

INVENTOR
CLARENCE W. KRAUS
BY
Beau, Brooks, Buckley & Beau.  ATTORNEYS

Patented Nov. 25, 1947

2,431,615

UNITED STATES PATENT OFFICE 2,431,615

METHOD OF MANUFACTURING BUILDING ELEMENTS

Clarence W. Kraus, Buffalo, N. Y.

Original application October 10, 1942, Serial No. 461,572. Divided and this application September 26, 1944, Serial No. 555,806

5 Claims. (Cl. 18—59)

This invention relates to the method and means employed in the manufacture of novel building elements. The present application is a division of co-pending application Serial No. 461,572, filed October 10, 1942, which has become Patent 2,384,686.

The article manufactured according to the present invention comprises a prefabricated building unit including an insulating panel having permanently secured thereto in the process of manufacture a plurality of cooperating building siding or roofing elements. In the illustrative example set forth herein the siding or roofing elements secured to the panel or base are conventional wood shingles, but it is to be understood that cooperating siding or roofing elements of other forms and of other materials may be dealt with according to the principles of the present invention to produce a prefabricated building element which avoids the necessity of applying each separate shingle or other siding or roofing element to the building individually. Among the equivalent shingle materials are asbestos, asphalt, tile, metal, slate and various composition materials.

In the several building elements set forth herein by way of example each prefabricated unit comprises several courses of overlapping shingles securely anchored to a backing slab of fibrous cellulosic material or of set gypsum or other cementitious material, both the fibrous panel or the cementitious slab and the several courses of shingles being adapted to abut and interlock respectively with base slabs and shingles of contiguous similar prefabricated units.

In producing prefabricated units according to the method of my invention the several courses of shingles or other siding or roofing elements are arranged in their desired relative positions, preferably with their ultimately exposed faces downward. The shingles or the like may be secured to each other in this position and are preferably simultaneously provided with anchoring means which may subsequently be embedded in the molded backing slab. Following this, and without rearrangement of the assembled shingles, a backing slab is cast or poured directly against the upper or rear face of the shingle assembly. Apart from the presence of the assembled shingles thereabeneath, the shingles having upwardly projecting anchorages which extend into the poured slab body, the formation of the fibrous or gypsum backing slab is accomplished in much the same fashion as pulp boards, gypsum wall boards and gypsum lath are fabricated on what are known in the art as "board machines." In the case of pulp boards modified adaptations of Fourdrinier machines may be employed if desired.

After the backing slab has set sufficiently to permit handling the entire assembly is placed in a kiln and excess moisture is removed by drying. It is in this phase of the instant method that a novel advantage is afforded, inasmuch as the necessity for kiln drying of the fibrous or gypsum slab makes it possible to employ green unseasoned shingles, where wood shingles are used. The kiln drying then effects seasoning of the shingles simultaneously with the ultimate drying of the backing slabs assembled therewith.

Formation of the fibrous or gypsum slab in the manner herein set forth, with the entire absence of any voids or spaces between the slab and the adjacent faces of the overlapping shingles, is found to substantially prevent warping of the shingles.

While several forms of prefabricated building units are shown and described in detail herein, by way of example, and while a single specific example of the method and means of my invention is set forth in detail, it is to be understood that the principles underlying the present invention are not limited specifically thereto, nor otherwise than as defined in the appended claims. In the description of specific embodiments frequent reference is had to gypsum backing slabs but it is to be understood that fibrous slabs are fully interchangeable and equivalent. The term fibrous slab is intended to include any pulp board consisting in whole or in part of cellulosic material and in fact the composition of the board may be a combination of fibrous and cementitious materials. Any moldable composition having the desired thermal characteristics may be employed.

In the drawings:

Fig. 1 is a perspective view of one form of the prefabricated building unit which may be produced by the method of my present invention;

Fig. 2 is an enlarged cross-sectional view showing fragmentarily the lower edge of one of the building units of Fig. 1 and the upper edge of the next subjacent unit, illustrating their manner of assembly in a finished wall;

Fig. 3 is a fragmentary cross-sectional perspective view showing the anchoring means which connects the several shingle elements to each other and to the gypsum backing slab;

Figure 17:
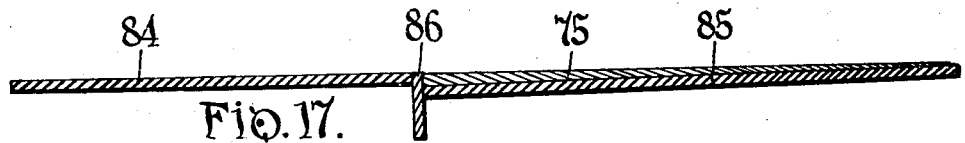
Figure 18:
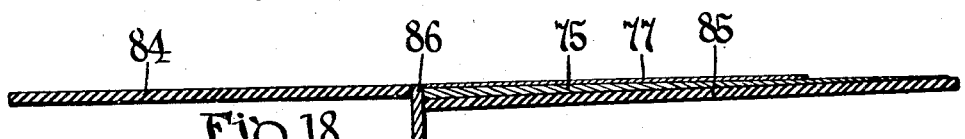

Figs. 4, 5 and 6 are fragmentary plan views of the fabricating means of my invention, illustrating the instant method. Fig. 4 is the left hand portion of the assembly means, Fig. 5 the mid portion, and Fig. 6 the right hand portion. It is to be understood that these figures illustrate a single longitudinal assembly path and are broken merely for convenience of illustration;

Figs. 7 through 14 are transverse cross-sectional views through the assembly means of Figs. 4, 5 and 6 illustrating various steps in the method of assembly of the form of prefabricated building element illustrated in Fig. 1;

Fig. 15 is a fragmentary perspective view of a modified form of prefabricated building unit;

Fig. 16 is a fragmentary cross-sectional view through the lower portion of one of the building units of Fig. 15 and the upper portion of another, showing their mode of assembly; and, Figs. 17 through 24 are transverse cross-sectional views through assembling means similar to that illustrated in the Figs. 4 through 14 but modified for the manufacture of the building unit of Figs. 15 and 16.

Throughout the several figures of the drawings like characters of reference denote like parts and, referring particularly to Fig. 1, the numeral 10 designates a course of full conventional tapered wood shingles. Overlapping the upper or tip portions of the shingles of the course 10 is a course 11 of shingle elements which in the illustrated instance comprise only the butt portions of conventional shingles and, as shown, the upper edges of the shingles of the course 11 extend only slightly beyond the tips of the shingles of the course 10.

The shingles of the course 10 are fully backed by a sheet of building paper 12 which is preferably tarred or otherwise impregnated to render the same weatherproof. The lower portions of the shingles of the course 10 have therebehind a course 13 of shingle elements which, in the illustrated instance, comprise the tip portions only of conventional wood shingles. The elements of the courses 11 and 13 may be provided by severing conventional shingles like those of the course 10. The particular proportions of the prefabricated unit may dictate the use of longer shingles in making up the elements of the courses 11 and 13 than those employed in the full shingle course 10. The shingle elements of the course 13 are separated from those of the course 10 by the building paper 12 and it will be noted that the shingles of the course 10, together with building paper 12, extend downwardly substantially below the lower edges of the elements of the course 13.

The entire shingle assembly thus far described is backed and supported by a gypsum slab or board 15 and, because the board 15 is cast in situ, the face thereof which is against the shingle assembly follows intimately the surface irregularities of such assembly. The presence of the course 13 of shingle tips serves to render the slab 15 of approximately uniform thickness. The manner in which the several shingle elements are secured to each other and held against the slab 15 will appear from the ensuing description of the method of manufacture thereof.

It will be noted that the upper edge of the slab 15 is substantially co-terminous with the upper edge of the shingle elements of the course 11 and the lower edge of the slab is substantially co-terminous with the lower edges of the shingles of the course 13. If desired the upper and lower edges of the slab 15 may be provided, respectively, with tongue and groove formations, designated 17 and 18 respectively in Fig. 1.

Fig. 2 illustrates the manner in which the lower edges of the shingles of course 10, together with the weatherproof paper 12, overlap the upper margins of the shingle elements of course 11 of a subjacent prefabricated element and likewise overlap the upper marginal portion of the backing slab 15 of such subjacent element. It will be noted further that the lower edges of the shingle elements of the course 11 substantially overlap the upper edges of the shingles of the course 13 to further the prevention of access of moisture to the slab 15 when the devices are assembled and in use.

Referring to Fig. 4 the numerals 25 and 26 designate a pair of adjacent and synchronously moving conveyor belts and, as appears from Figs. 7 through 14, the belts 25 and 26 are separated by a gage bar 27 and are arranged to run at slightly different elevations to assist in proper positioning of shingles thereon, as will presently appear. Gage bars 28 and 29 are shown in Fig. 4 for defining the horizontal length of building elements to be fabricated and for establishing predetermined unshingled spaces at the lateral edges of the prefabricated units.

It is to be understood that a single composite belt may be substituted for the pair of belts 25 and 26. This may be accomplished by merely overlapping the marginal portion of two belts and securing them by cementing, stapling, sewing or otherwise. The edge of the upper overlapping belt will then perform the function of the gage bar 27.

The first step in the assembling operation comprises the positioning of the butt portions of shingles to form the course 11. This is accomplished by placing the shingle butt portions with their butt ends against the gage bar 27 as shown in Figs. 4 and 7. The full shingles of the course 10 are then placed upon the assembled course 11 as shown at the right hand portion of Fig. 4 and in Fig. 8, a gage bar 30 being provided for locating the butt ends of the shingles of the course 10. Following this the conveyor belts 25 and 26 bring the partially assembled unit to a station illustrated at the left hand portion of Fig. 5 where weatherproof paper, designated 12 in Fig. 1, is applied, as from a roll 33. This step is further illustrated in Fig. 9 where a gage bar 34 positions the paper 12 laterally. Following this the assembly arrives at a position illustrated in the mid portion of Fig. 5 where the tip elements of shingles, for forming the course 13, are arranged upon and against the weatherproof sheet 12. To effect proper location of the elements of the course 13 an overhanging horizontal gage bar 36 is provided.

Conventional gypsum wall boards generally comprise a set gypsum core having paper secured across the opposite faces thereof and the paper is generally folded about the marginal edges of the core. In conventional board machines fabrication is accomplished by running a sheet of facing paper along a conveyor belt, depositing plaster thereon, sizing the thickness of the plaster by means of caliper rolls, bringing the edges of the lower paper sheet up around the edges of the gypsum core, and then applying an upper sheet of facing paper to the deposited plaster core, to complete the wall board.

In proceeding to supply the shingle assembly thus far described with a backing comprising a unitary set gypsum slab it is desired that the slab have paper facings both at its exposed face and at the face which is against the shingle assembly. To this end the next step, which is shown at the right of Fig. 5, comprises placing a sheet of paper 38 over the shingle assembly. The paper 38 may be drawn directly from a roll 39. As shown in Fig. 5 the lateral margins of the paper 38 project beyond the shingle assembly to provide selvage portions for subsequent folding to embrace the edges of the gypsum slab.

Following the placement of the paper 38 the assembly thus far achieved is secured as a rigid unit by means of staple or wire stitches and in the present instance three longitudinal rows of staples are employed. One row, designated 40, extends through the butt portions of the shingles of the course 10, through the thicker part of the shingle portions of the course 13, through the intervening building paper 12, and through the gypsum slab facing paper 38. As shown in the perspective view, Fig. 3 the stitches are so formed that their terminal portions are clenched in the outer faces of the shingles of the course 10 and are so arranged that they have bight portions extending above the surface of the gypsum slab facing paper 38 to be subsequently embedded in the gypsum slab. Clenching the staples at the outer face of the prefabricated building unit enables the applicator to avoid the staples in sawing or to remove staples that interfere with sawing when avoidance is not feasible.

A second row of stitches designated 41 extends through the thin edges of the shingle portions of the course 13, through the mid portions of the shingles of the course 10 and through the thick ends of the shingle portions of the course 11. The stitches of the row 41 likewise are clenched at the outer face of the assembly and have bight portions arranged to anchor into the gypsum slab.

A third row of stitches is designated 42 and extends through the thinner ends of the shingles of the course 11 to secure the same to the gypsum slab when the latter is cast in such manner as to embed the bight portions of the stitches. The rows of stitches 40, 41 and 42 are applied by means of stitcher heads indicated schematically at the left end of Fig. 6 and designated 43, 44 and 45, respectively. Suitable anvil portions for clenching the stitches may be carried by the side frames of the machine for clenching the stitches 40 and 42 respectively and are designated 47 and 48 in Figs. 6 and 12. A third anvil portion for cooperating with the stitcher head 41 is designated 49 and may be secured to the stationary gage bar 27 which is disposed between the belts 25 and 26. When a composite belt is employed, as mentioned hereinbefore, the anvil portions for the center row of stitches 41 may be carried directly by the belt, and in fact the outer anvil portions may be similarly arranged.

After the stitches are placed and the several courses of shingles are temporarily assembled the assembly passes beneath suitable scoring discs (not shown) for scoring the gypsum slab facing paper 38 as indicated at 50 and 51 in Fig. 6. Following this the assembly passes conventional die or roll forming means for bringing the marginal edges of the paper 38 into the form indicated at 53 and 54 in Fig. 12. The assembly then passes beneath a hopper containing a slurry of plastic mix which is deposited upon the paper sheet 38 by means of a spout or nozzle 60. The manner in which the rate of deposit is controlled by placement of the nozzle 60 is entirely conventional. A caliper roll 61 then accurately sizes the deposited plaster as to thickness, the slurry being confined laterally by the folded-up margins 53 and 54 of the paper facing 38. The upper marginal edges of the turned up portions 53 and 54 of the paper 38 are then folded across the top of the formed slab as indicated at 64 and 65 in Figs. 6 and 13, again by conventional die or roll forming means.

The final step of assembly, illustrated at the right of Fig. 6 and in Fig. 14, comprises the placing of an outer facing sheet 67 across the upper surface of the slab 15. This paper may be drawn from a roll 68 and a final caliper roll 69 urges the sheet 67 against the deposited plaster and finally sizes the thickness of the unit. The assembly then encounters a conventional shear 70 for cutting the gypsum slabs into predetermined length units and it will be noted that the cuts are made through the unshingled spaces created by the gage bars 28 and 29, so that only the backing slab need be cut.

As has been stated before and as is clearly shown in Fig. 1, the shingle courses do not extend to the lateral edges of the slab 15. Accordingly, after a number of the prefabricated units are secured against building framework in the nature of studding or the like, the shingle siding may be completed by covering the joints between slabs with weatherproof paper and applying shingle portions to complete the courses 10 and 11. Since the mode of assembly of the prefabricated units will result in gaps in the shingle courses of uniform width, standard filling in shingle elements may be supplied to the applicator.

After having been thus formed the assemblies comprising the gypsum slabs 15 and the variously applied courses of shingles are placed in a drying kiln (not shown) where excess moisture is removed from the plaster slab and the green uncured shingles are properly seasoned at the same time.

In the alternative form of prefabricated building unit illustrated in Figs. 15 and 16 two horizontal courses of overlapping shingles are provided. The upper of these courses is designated 75, and the lower 76. The shingles of the courses 75 and 76 may be of substantially equal length. As shown in Fig. 16 each of the courses 75 and 76 has a backing sheet of weatherproof material, such as tar paper or the like, these sheets being designated 77 and 78, respectively. The sheets 77 and 78 are so arranged that the lower edge of the former overlaps the upper edge of the latter.

A gypsum backing slab 79 corresponds to the slab 15 of the first described embodiment and is assembled with the shingle courses 75 and 76 in a similar manner. It will be noted from Fig. 15 that the upper or tip edges of the shingles of the courses 75 extend substantially beyond the upper edge of the gypsum slab 79. It will be further noted that the lower marginal portion of the slab 79 recedes from the lower butt portions of the shingles of the course 76 to provide a pocket 80 for receiving the upwardly extending tip edges of the upper courses of shingles of a subjacent prefabricated building unit. The manner in which vertically adjacent building units interfit is best shown in the detailed cross-section, Fig. 16.

Figs. 17 through 24 are successive cross-sections through a continuous conveyor type machine which is similar in arrangement to that shown in plan in Figs. 4, 5 and 6. Views corresponding to Figs. 4, 5 and 6 are not shown in the embodiment now being described since the details thereof will be the same as in Figs. 4, 5 and 6 excepting for obvious modifications in location of gages and the like. These modifications will be clear to those skilled in the art from Figs. 17 through 24.

Belt sections 84 and 85 correspond to the belt sections 25 and 26 of Figs. 4 through 15 and a medial gage bar 86 takes the place of the gage bar 27 of those figures. Here again the substitution of a unitary belt is within the purview of the invention. Fig. 17 shows the placement of shingles of the course 75 with their butt ends against the gage bar 86. As appears from Fig. 18, the same gage bar 86 may be employed in locating the weatherproof backing sheet 77.

Figure 19:
Figure 20:
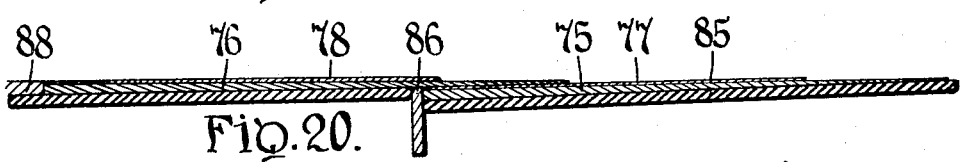
Figure 21:
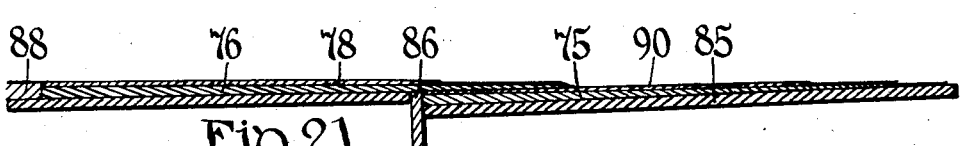

As seen in Fig. 19, the belt sections 84 and 85 then encounter a gage bar 88 for locating the butt ends of the shingles of the course 76 and, Fig. 20, the same gage bar locates the weatherproof backing sheet 78. Fig. 21 shows the placement of a paper sheet 90 which comprises one of the facing sheets of the gypsum slab 79 and corresponds to the sheet 38 of Figs. 1 through 14.

Figure 22:
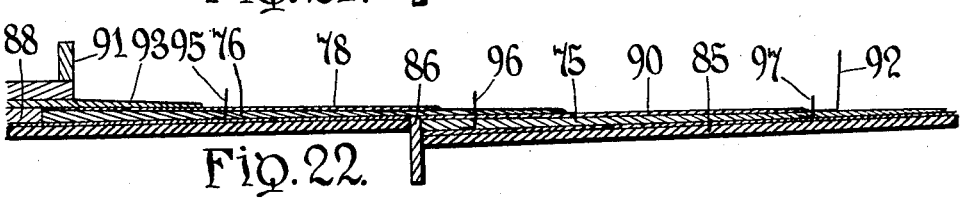

When the assembly reaches the station shown in Fig. 22 the marginal portions of the sheet 90 are turned up as shown at 91 and 92 and a pocket-forming bar or plate 93 is provided. The plate 93 is disposed between the sheet 90 and the weatherproof sheet 78 of the shingles of the course 76 and removal thereof after completion of the gypsum slab 79 leaves the pocket 80 for receiving the upwardly extending edges of the shingles 75 of a next subjacent building unit. Fig. 22 also illustrates the placement of several horizontal rows of staples or stitches which again are the same in detail as shown in Fig. 3. A row 95 extends along the shingles of the course 76 immediately above the plate 93 which forms pocket 90. A second row 96 extends through both courses, 75 and 76, where they overlap. A third row 97 is secured in the tip ends of the shingles of the course 75 to ultimately secure them to the slab 79 by embedding of their bight portions therein.

Figure 23:
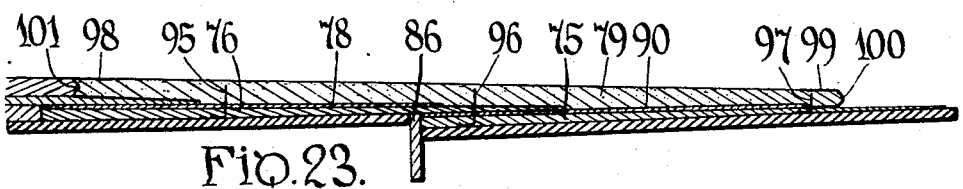
Figure 24:
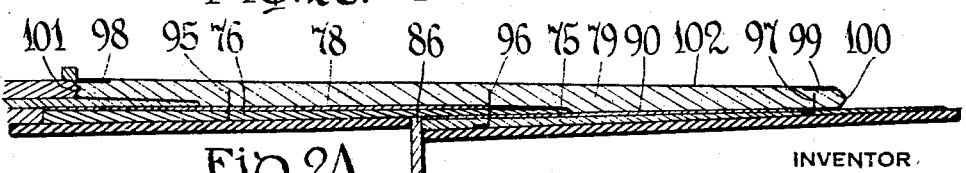

Fig. 23 shows the step of depositing the gypsum slab 79 and the subsequent step of folding the upstanding marginal portions 91 and 92 over the top of the slab as at 98 and 99, respectively. If desired the slab 79 may be provided with upper and lower tongue and groove formations, as in the previous instance. These formations are designated 100 and 101 respectively in this modification. Fig. 24 illustrates the final assembly step of placing a sheet of paper over the top surface of the slab 79 for completing its envelopment. In Fig. 24 the final paper facing is designated 101.

What is claimed is:

1. The method of fabricating a building unit comprising placing successive courses of overlapping shingle elements face down in desired assembled relationship, applying fasteners to secure said courses to each other in such manner as to leave portions of the fasteners projecting from the upper rear faces of the shingle elements, and casting a plastic composition thereon to embed said projecting portions, whereby upon setting of said composition there is provided a base slab integrally associated with the shingle elements by embedding of the projecting portions of the fasteners therein.

2. The method of fabricating a building unit comprising placing successive courses of shingle elements in overlapping assembled relationship, applying fasteners to secure said courses to each other in such manner as to leave portions of the fasteners projecting from corresponding faces of the shingle elements, and casting a plastic composition against such faces to embed said projecting portions, whereby upon setting of said composition there is provided a base slab integrally associated with the shingle elements by embedding of the projecting portions of the fasteners therein.

3. The method of fabricating a building unit comprising placing successive courses of shingle elements in overlapping assembled relationship, securing said courses of shingles to each other with staples by projecting the prongs thereof into said shingles and clenching, while leaving the bight portions of the staples spaced outwardly of the faces of the shingles at one side of said unit, and casting a plastic composition against the faces of the shingles at such side of the unit to embed said bight portions, whereby upon setting of said composition there is provided a base slab integrally associated with the shingle elements by interlocking of the bight portions of the staples in the body of the base slab.

4. The method of fabricating a building unit comprising placing successive courses of shingle elements in overlapping assembled relationship, securing said courses of shingles to each other with staples by projecting the prongs thereof into said shingles and clenching, while leaving the bight portions of the staples spaced outwardly of the faces of the shingles at one side of said unit, and casting a plastic composition against the faces of the shingles at such side of the unit to embed said bight portions, whereby upon setting of said composition there is provided a base slab integrally associated with the shingle elements by interlocking of the bight portions of the staples in the body of the base slab, and providing the base slab with complementary interfitting edge formations at opposite longitudinal edges thereof during the casting operation.

5. The method of fabricating a building unit comprising placing successive courses of wooden shingle elements of tapered thickness in conventionally overlapping assembled relationship, securing said courses of shingles to each other with staples by driving the prongs thereof into said shingles and clenching, while leaving the bight portions of the staples spaced outwardly of the faces of the shingles at one side of said unit, and casting a plastic composition against the faces of the shingles at such side of the unit to embed said bight portions, whereby upon setting of said composition there is provided a base slab integrally associated with the shingle elements by interlocking of the bight portions of the staples in the body of the base slab, and providing the base slab with complementary interfitting edge formations at opposite longitudinal edges thereof during the casting operation.

CLARENCE W. KRAUS.

REFERENCES CITED

The following references are of record in the file of this patent:

UNITED STATES PATENTS

| Number | Name | Date |
| --- | --- | --- |
| 836,369 | Dexter | Nov. 20, 1906 |
| 1,673,637 | Petersen | June 12, 1928 |
| 1,970,860 | Lowell | Aug. 21, 1934 |
| 2,266,510 | Pottinger | Dec. 16, 1941 |
| 2,348,829 | MacArthur et al. | May 16, 1944 |
| 2,384,686 | Kraus | Sept. 11, 1945 |